US011959607B2

(12) United States Patent

Kim et al.

(10) Patent No.: US 11,959,607 B2

(45) Date of Patent: Apr. 16, 2024

(54) VEHICLE LAMP

(71) Applicant: SL Corporation, Daegu (KR)

(72) Inventors: Kae Hong Kim, Gyeongsan-si (KR); Tae Seok Seo, Gyeongsan-si (KR); Hyo Jin Han, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/194,573

(22) Filed: Mar. 31, 2023

(65) Prior Publication Data

US 2023/0341100 A1 Oct. 26, 2023

(30) Foreign Application Priority Data

Apr. 25, 2022 (KR) ........................ 10-2022-0050954

(51) Int. Cl.

| | |
|---|---|
| ***F21S 41/25*** | (2018.01) |
| ***F21S 41/143*** | (2018.01) |
| ***F21S 41/151*** | (2018.01) |

(52) U.S. Cl.

CPC ............ *F21S 41/25* (2018.01); *F21S 41/143* (2018.01); *F21S 41/151* (2018.01)

(58) Field of Classification Search

CPC ......... F21W 2102/155; F21W 2103/10; F21W 2103/20; F21W 2103/35; F21W 2103/40; F21W 2103/55; F21S 41/285; F21S 41/43; F21S 43/14; F21S 43/15; F21S 43/239; F21S 43/26; F21S 41/151; F21S 41/265; G02B 19/0066

See application file for complete search history.

(56) References Cited

U.S. PATENT DOCUMENTS

| | | | | |
|---|---|---|---|---|
| 2018/0087732 | A1* | 3/2018 | De Lamberterie ..... | F21S 41/16 |
| 2019/0203897 | A1* | 7/2019 | Kim ...................... | F21S 41/285 |

* cited by examiner

*Primary Examiner* — Elmito Breval

(74) *Attorney, Agent, or Firm* — United One Law Group LLC; Kongsik Kim; Jhongwoo Peck

(57) ABSTRACT

A vehicle lamp for forming a predetermined beam pattern using a plurality of lamp modules is provided. Each of the lamp modules includes a light source unit that generates light and includes a plurality of light source chips; an optical path adjustment unit that guides a path of the light irradiated from the light source unit; and an optical unit that transmits the light guided by the optical path adjustment unit to form a beam pattern including at least one light irradiation pattern formed by at least one of the plurality of light source chips. In particular, the plurality of light source chips are arranged in a left-right direction.

12 Claims, 15 Drawing Sheets

| | |
|---|---|
| FIRST CENTRAL AXIS (AX1) AND SECOND CENTRAL AXIS (AX2) COINCIDE IN UP-DOWN DIRECTION |  |
| SECOND CENTRAL AXIS (AX2) IS LOCATED ABOVE FIRST CENTRAL AXIS (AX1) |  |

VEHICLE LAMP

CROSS REFERENCE TO RELATED APPLICATION

This application claims priority from Korean Patent Application No. 10-2022-0050954, filed on Apr. 25, 2022, which is incorporated herein by reference in its entirety.

BACKGROUND

1. Technical Field

The present disclosure relates to a vehicle lamp, and more particularly, to a vehicle lamp capable of more effectively satisfying light distribution characteristics of a beam pattern.

2. Description of the Related Art

Generally, a vehicle includes various types of vehicle lamps having an illumination function and a signaling function. The illumination function enables the driver of the vehicle to more easily detect objects around the vehicle while driving in low-light conditions (e.g., at night), and the signaling function is used to inform other vehicles or road users of the vehicle's driving state.

For example, a headlamp and a fog lamp are designed primarily for the illumination function, and a turn signal lamp, a tail lamp, and a brake lamp are designed primarily for the signaling function. The installation standards and specifications of these vehicle lamps are prescribed by laws and/or regulations so that each function can fully meet the standards.

Recently, research has been actively conducted to reduce the size of vehicle lamps by using micro lenses having a relatively short focal length. In this case, light incident from a light source to a plurality of micro incident lenses is emitted through a plurality of micro exit lenses to form a beam pattern suitable for the use of a vehicle lamp, and a collimator is used to adjust the path of the light so that the light from the light source is incident on the micro incident lenses with a minimal loss.

Meanwhile, it is necessary to separately manufacture a plurality of micro incident lenses, a plurality of micro exit lenses, and a collimator based on light distribution characteristics of a beam pattern to be formed by a vehicle lamp. In this case, however, manufacturing costs increase, and the productivity decreases. Therefore, it is required to come up with ways to more easily satisfy the light distribution characteristics without needing to separately manufacture a plurality of micro incident lenses, a plurality of micro exit lenses, and a collimator based on the light distribution characteristics.

SUMMARY

Aspects of the present disclosure provide a vehicle lamp which satisfies light distribution characteristics of a beam pattern by particularly arranging components for forming the beam pattern.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a vehicle lamp for forming a predetermined beam pattern using a plurality of lamp modules. Each of the lamp modules may include a light source unit that generates light and includes a plurality of light source chips; an optical path adjustment unit that guides a path of the light irradiated from the light source unit; and an optical unit that transmits the light guided by the optical path adjustment unit to form a beam pattern including at least one light irradiation pattern formed by at least one of the plurality of light source chips. In particular, the plurality of light source chips may be arranged in a left-right direction.

Further, the plurality of lamp modules may be arranged in the left-right direction.

Each of the plurality of light source chips may include a light source that has a light emitting surface of a predetermined size and a packaging that accommodates the light source.

The optical path adjustment unit may include a first collimator disposed in front of the plurality of light source chips and a second collimator disposed in front of the first collimator. A first central axis of the first collimator and a second central axis of the second collimator may be vertically spaced apart from each other in an up-down direction.

The second central axis may be disposed above the first central axis so that a central portion of a light irradiation pattern formed by each of the plurality of light source chips is shifted upward with respect to a longitudinal reference axis of the vehicle. The first central axis and the second central axis may be disposed at a same lateral position with respect to the longitudinal reference axis.

A center line that passes through a center of the light emitting surface of each of the plurality of light source chips may be disposed on either a left side or a right side of the first central axis and the second central axis in the left-right direction.

The center line that passes through the center of the light emitting element of each of the plurality of light source chips may be disposed vertically between the first central axis and the second central axis in the up-down direction so that a high-illuminance area of the light irradiation pattern is shifted toward a lower end of the light irradiation pattern.

The optical path adjustment unit may have a numerical aperture defined by a refractive index of a space through which the light irradiated from the light source unit proceeds and a light irradiation angle of each of the plurality of light source chips. More particularly, the numerical aperture of the optical path adjustment unit may be set to about 0.5 to about 0.866.

The optical unit may include a plurality of incident lenses to which light from each of the plurality of light source chips that is guided by the optical path adjustment unit is incident and a plurality of exit lenses corresponding to the plurality of incident lenses. Center lines of an incident lens and an exit lens corresponding to each other among the plurality of incident lenses and the plurality of exit lenses may be spaced apart from each other in the left-right direction. The incident lens among the plurality of incident lenses may have a focal length longer than a focal length of the exit lens corresponding to the incident lens. A ratio of the focal length of the incident lens to the focal length of the exit lens may be set to about 1.5:1 to about 2:1.

A horizontal width of the light emitting surface of each of the plurality of light source chips may be about 70% or less of a horizontal width of corresponding incident and exit lenses among the plurality of incident lenses and the plurality of exit lenses.

A vehicle lamp according to the present disclosure may provide one or more of the following advantages. The light distribution characteristics of a beam pattern may be satisfied by adjusting a center line of a light emitting surface of each light source chip and the position of a central axis of each of a plurality of collimators without separately manufacturing incident and exit lenses and collimators depending on the light distribution characteristics. Therefore, costs can be reduced, and the productivity can be improved. In addition, incident and exit lenses corresponding to each other among a plurality of incident lenses and a plurality of exit lenses may be spaced apart from each other in the left-right direction. Therefore, a plurality of light source chips can be more easily arranged.

However, the effects of the present disclosure are not restricted to those set forth herein. The above and other effects of the present disclosure will become more apparent to one of ordinary skill in the art to which the present disclosure pertains.

BRIEF DESCRIPTION OF THE DRAWINGS

The above and/or other aspects will become apparent and more readily appreciated from the following description of the embodiments, taken in conjunction with the accompanying drawings in which.

DETAILED DESCRIPTION

Figure 1:
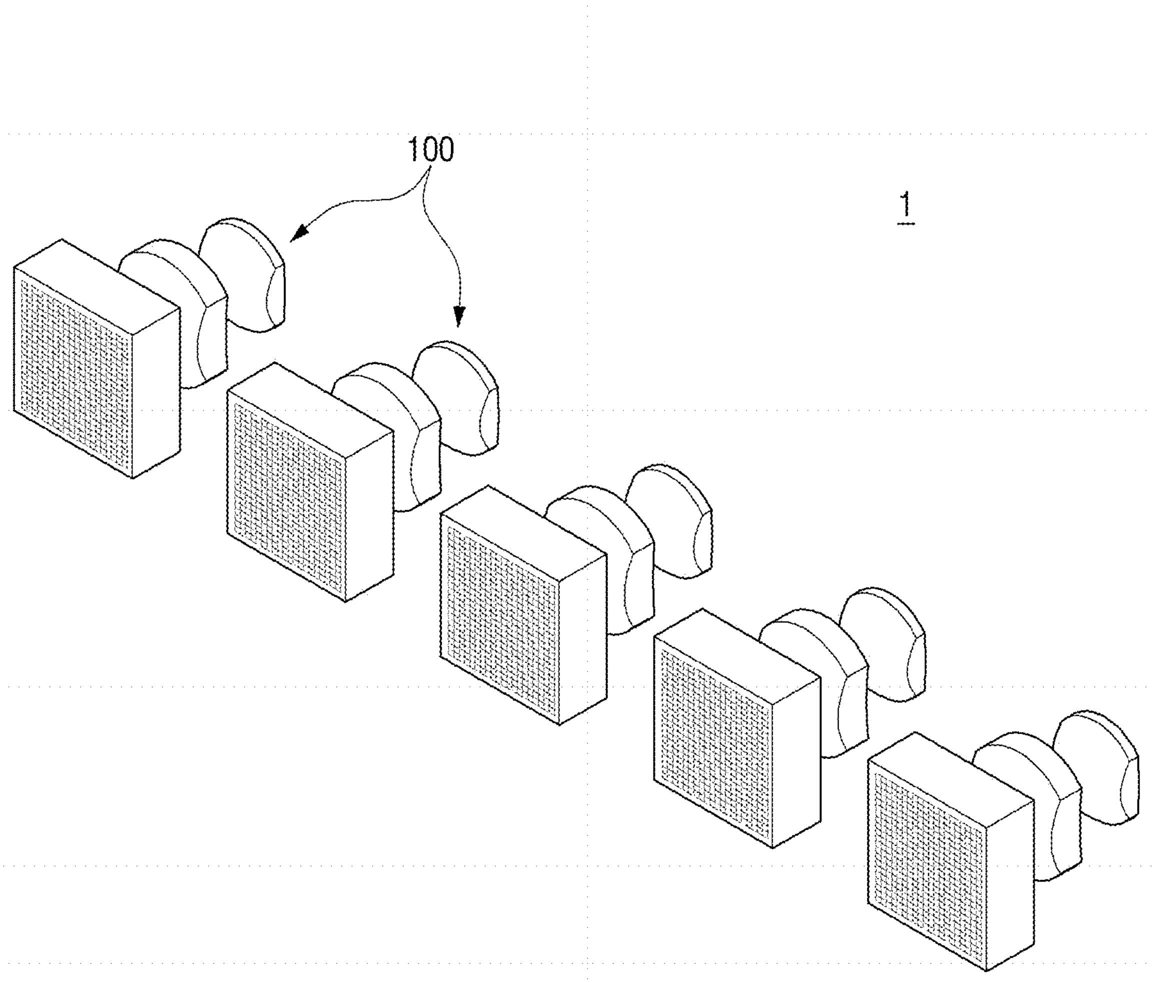
FIG. 1 is a perspective view of a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures, and techniques will not be described in detail to avoid obscuring the disclosure.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

Embodiments of the disclosure are described herein with reference to plan and cross-section illustrations that are schematic illustrations of exemplary embodiments of the invention. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the preset disclosure will be described with reference to the drawings for describing vehicle lamps according to embodiments of the present disclosure.

Figure 2:
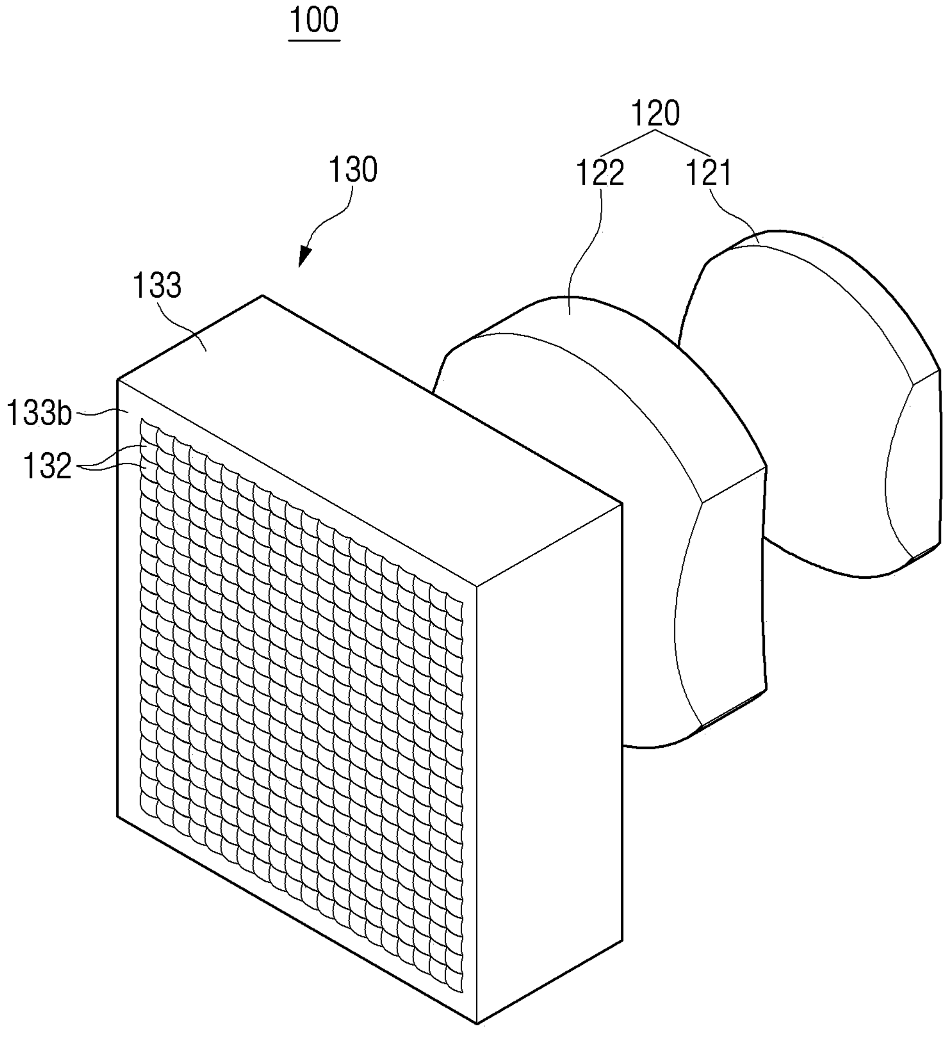
FIGS. 2 and 3 are perspective views of a lamp module according to an embodiment of the present disclosure.
Figure 3:
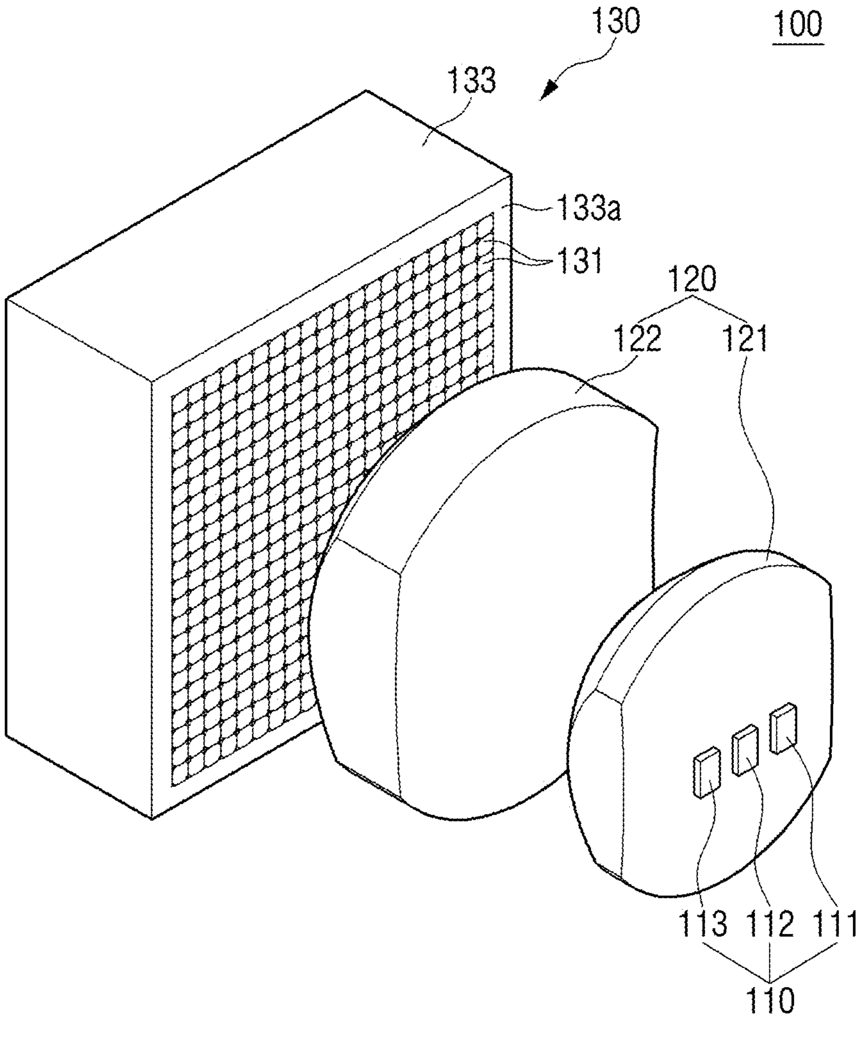
Figure 4:
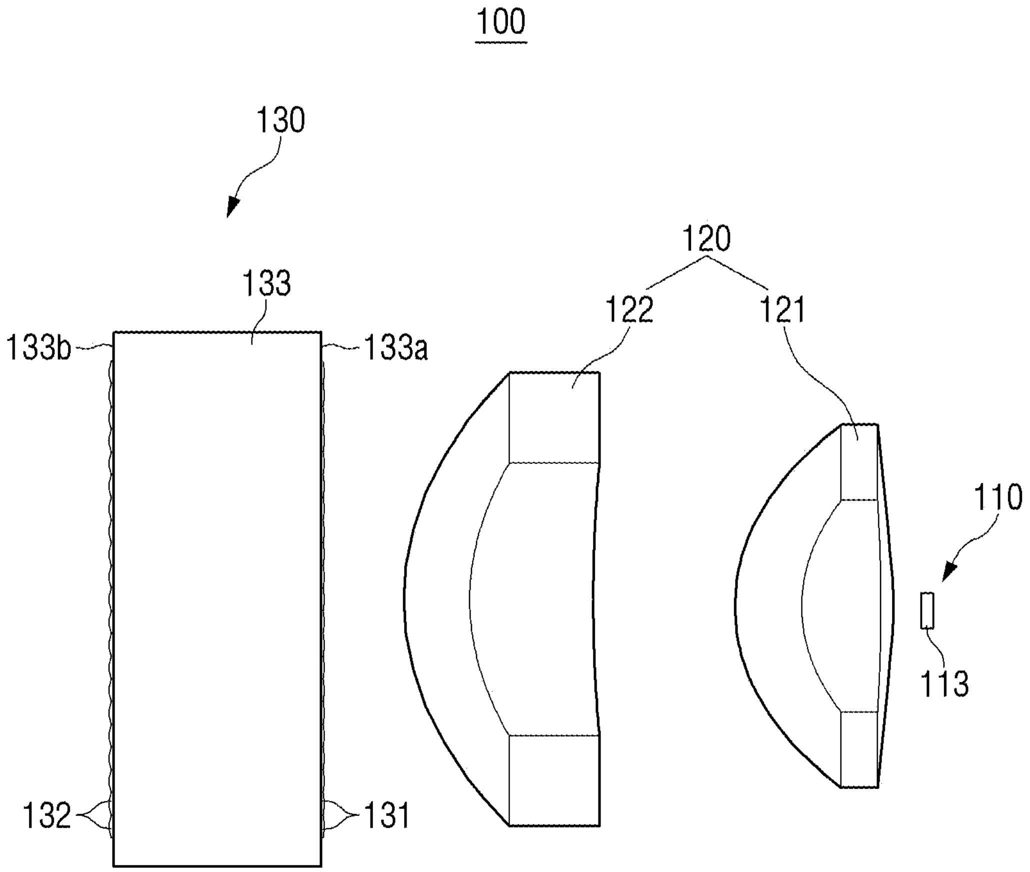
FIG. 4 is a side view of the lamp module according to the embodiment of the present disclosure.
Figure 5:
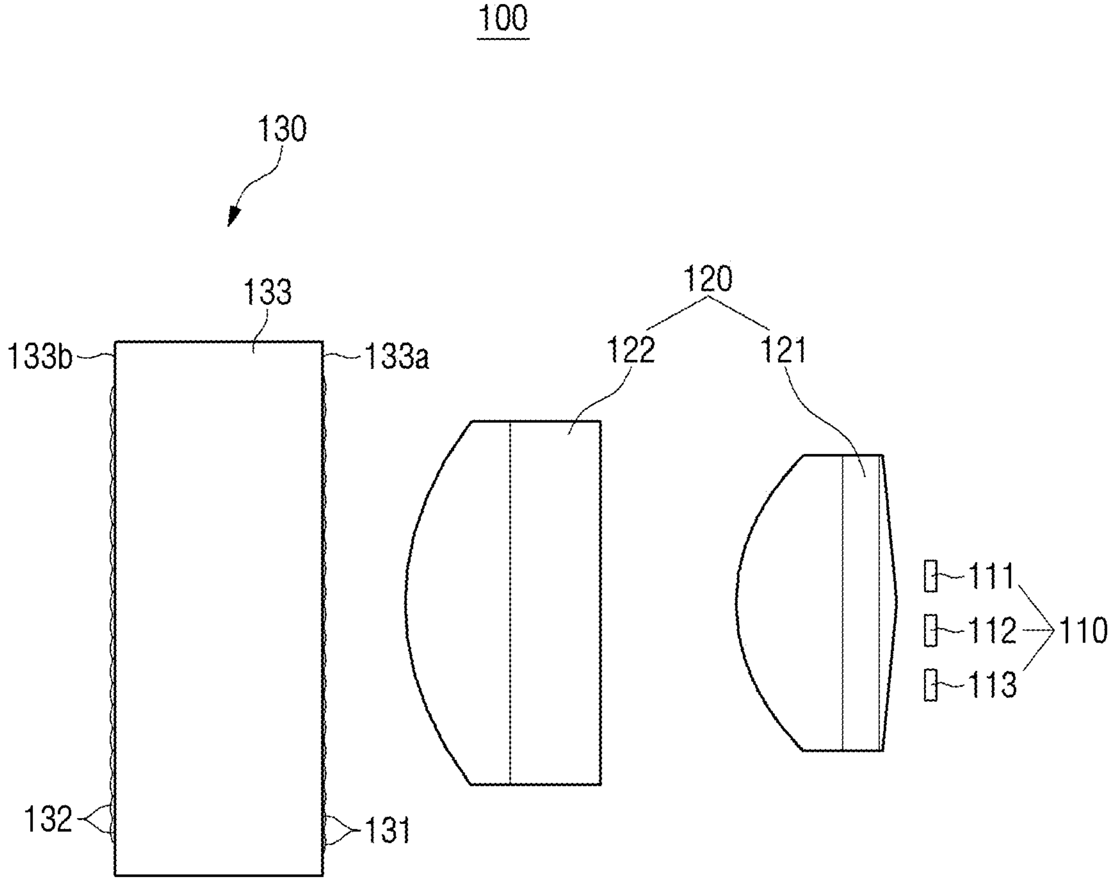
FIG. 5 is a top view of the lamp module according to the embodiment of the present disclosure.

FIG. 1 is a perspective view of a vehicle lamp 1 according to an embodiment of the present disclosure. FIGS. 2 and 3 are perspective views of a lamp module 100 according to an embodiment of the present disclosure. FIG. 4 is a side view of the lamp module 100 according to the embodiment of the present disclosure. FIG. 5 is a top view of the lamp module 100 according to the embodiment of the present disclosure.

Referring to FIGS. 1-5, the vehicle lamp 1 according to the embodiment of the present disclosure may include a plurality of lamp modules 100. Light emitted from at least one of the lamp modules 100 may form a beam pattern suitable for the use of the vehicle lamp 1 of the present disclosure.

In the embodiment of the present disclosure, an example where the vehicle lamp 1 is used as a headlamp will be described, in which the headlamp irradiates light in a proceeding direction (e.g., a forward direction) of a vehicle to secure a driver’s forward view when the vehicle is driven in low-light conditions (e.g., at night or in a tunnel). However, the present disclosure is not limited thereto, and the vehicle lamp 1 of the present disclosure may be used not only as a headlamp but also as various lamps installed in vehicles, such as a tail lamp, a brake lamp, a fog lamp, a position lamp, a turn signal lamp, a daytime running lamp, a backup lamp, and the like.

When the vehicle lamp 1 of the present disclosure is used as a headlamp, it may be configured to form a low beam pattern in which light is irradiated below a predetermined cutoff line to avoid dazzling drivers of vehicles ahead such as preceding vehicles or oncoming vehicles. Further, the vehicle lamp 1 of the present disclosure may be configured to form a high beam pattern to secure a long-distance view ahead of the vehicle.

In the embodiment of the present disclosure, an example where the vehicle lamp 1 forms a high beam pattern will be described. In this case, the vehicle lamp 1 of the present disclosure may form a shadow area by preventing the irradiation of light to an area corresponding to a vehicle ahead in the high beam pattern or by reducing the brightness of light irradiated to the area corresponding to the vehicle ahead. Therefore, the vehicle lamp 1 may sufficiently secure the driver's view ahead while preventing glare to the driver of the vehicle ahead.

In the embodiment of the present disclosure, an example where the lamp modules 100 are arranged in a left-right direction will be described. However, this configuration is merely an example to help understanding the present disclosure, and the present disclosure is not limited thereto. The lamp modules 100 may be arranged in at least one direction based on the layout or design of the vehicle lamp 1 of the present disclosure.

In the embodiment of the present disclosure, the description will be provided for one of the lamp modules 100. However, similar description may be applied to other lamp modules 100 with only some differences in terms of the installation position or the like.

A lamp module 100 may include a light source unit 110, an optical path adjustment unit 120, and an optical unit 130.

Figure 6:
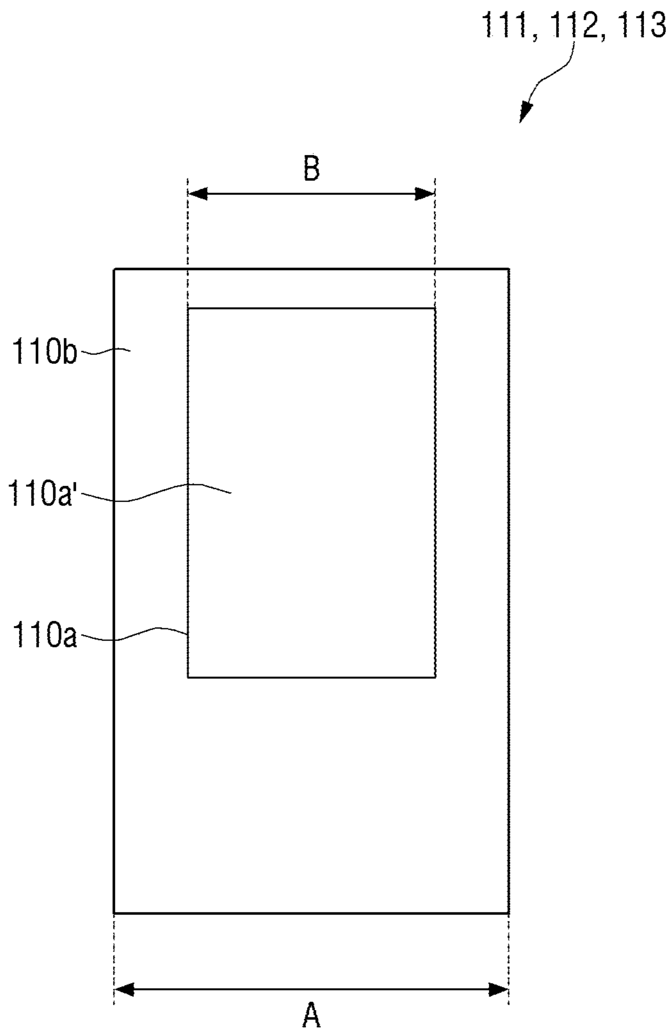
FIG. 6 is a schematic view of a light source chip according to an embodiment of the present disclosure.

The light source unit 110 may include a plurality of light source chips 111-113. In the embodiment of the present disclosure, the light source chips 111-113 may be arranged in the left-right direction. As illustrated in FIG. 6, each of the light source chips 111-113 may include a light source 110*a* having a light emitting surface 110*a*' of a predetermined size and a packaging 110*b* (e.g., a circuit board, a board, an enclosure, a casing, a housing, or the like) that accommodates the light source 110*a*.

Here, a width A of the packaging 110*b* along the left-right direction may be about 250% or less of a width B of the light emitting surface 110*a*'. When the width A of the packaging 110*b* is greater than about 250% of the width B of the light emitting surface 110*a*', a distance between adjacent light emitting surfaces may become relatively large due to the size of the packaging 110*b*. As such, light distribution characteristics of a beam pattern formed by the vehicle lamp, such as the position, shape, size, and brightness of an area to which light is irradiated may not be satisfied.

Figure 7:
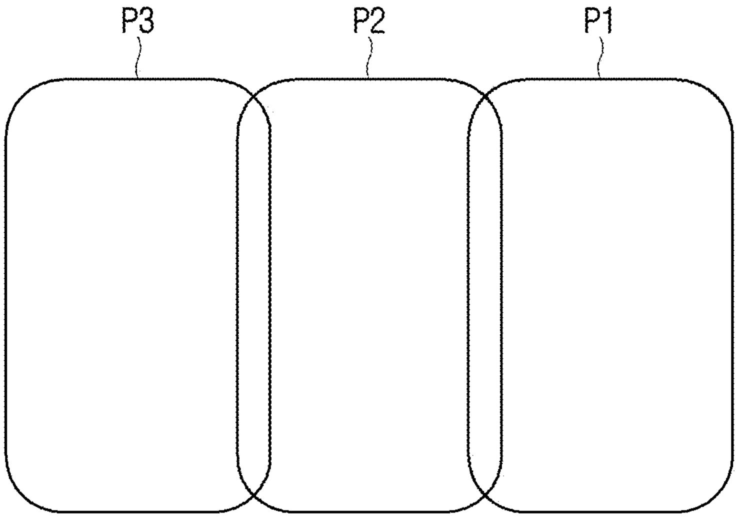
FIG. 7 is a schematic view illustrating light irradiation patterns formed by the lamp module according to the embodiment of the present disclosure.

In the embodiment of the present disclosure, the light source chips 111-113 may be arranged in the left-right direction so that a plurality of light irradiation patterns P1-P3 that are respectively formed by the light generated from the light source chips 111-113 are arranged in the left-right direction as illustrated in FIG. 7, thereby allowing a beam pattern of the vehicle lamp 1 of the present disclosure to be formed. In addition, the light source chips 111-113 may be arranged in the left-right direction to form a shadow area by turning off or reducing the amount of light of at least one of the light source chips 111-113 based on the position of a vehicle ahead so that a corresponding light irradiation pattern may be prevented from being irradiated or the brightness of the light irradiation pattern may be reduced.

Here, adjacent light irradiation patterns among the light irradiation patterns P1-P3 may be formed to partially overlap each other. If adjacent light irradiation patterns among the light irradiation patterns P1 through P3 are spaced apart from one another, an unnecessary shadow area may be formed, and thus, the driver's view may be obstructed. Accordingly, the width A of the packaging 110*b* may be about 250% or less of the width B of the light emitting surface 110*a*' as described above.

In other words, if the width A of the packaging 110*b* is greater than about 250% of the width B of the light emitting surface 110*a*', there may be a limit to reducing the distance between adjacent light emitting surfaces 110*a*' due to the size of the packaging 110*b*. In this case, adjacent light irradiation patterns among the light irradiation patterns P1-P3 may be spaced apart from one another, thereby forming an unnecessary shadow area. Therefore, the width A of the packaging 110*b* may be configured to be about 250% or less of the width B of the light emitting surface 110*a*'.

In addition, FIG. 7 is an example where three light irradiation patterns P1-P3 are formed by one lamp module 100. When the vehicle lamp 1 of the present disclosure includes a plurality of lamp modules 100, at least one light irradiation pattern formed by each of the lamp modules 100 may be disposed on at least one of both sides of the light irradiation patterns P1-P3 of FIG. 7 in the left-right direction to form a high beam pattern.

In the example provided as an embodiment of the present disclosure, since the light source chips 111-113 include three light source chips, it may be understood that the light irradiation patterns P1-P3 include three light irradiation patterns. However, the present disclosure is not limited thereto, and the number of light irradiation patterns may vary according to the number of light source chips, or two or more light source chips may be used to collectively form one light irradiation pattern.

In addition, although an example where the light source unit 110 includes three light source chips 111-113 is described as in the embodiment of the present disclosure, this configuration is merely to make each of the lamp modules 100 form three light irradiation patterns, and the present disclosure is not limited thereto. The number of light source chips included in each of the lamp modules 100 may vary according to the number of light irradiation patterns to be formed by each of the lamp modules 100.

The optical path adjustment unit 120 may guide the light generated from the light source unit 110 to be incident on the optical unit 130 with a minimal loss by adjusting the path of the light generated from the light source unit 110.

Figure 8:
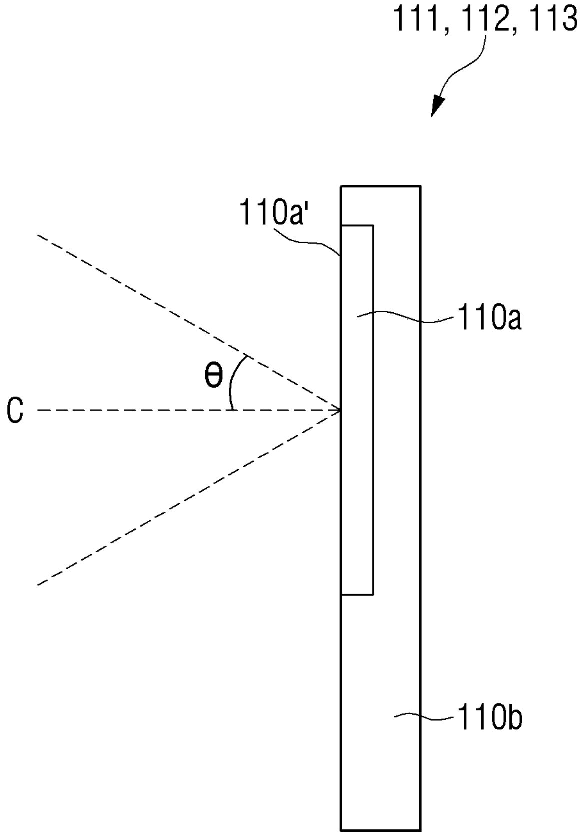
FIG. 8 is a schematic view illustrating a light irradiation angle of the light source chip according to the embodiment of the present disclosure.

The optical path adjustment unit 120 may include a numerical aperture (NA), which may be defined by a light irradiation angle of each of the light source chips 111-113 and a refractive index of a space through which the light proceeds. The numerical aperture may be calculated by $NA=n\times\sin\theta$, where θ may be understood as a light irradiation angle at which the light is irradiated with respect to a center line C that passes through a center of the light emitting surface 110*a*' as illustrated in FIG. 8. Since a medium in which the light proceeds between the light source unit 110 and the optical path adjustment unit 120 is presumably air, n may be approximately unity. Therefore, the above formula may be reduced to $NA=\sin\theta$ when the medium is air.

In the embodiment of the present disclosure, an example where the light irradiation angle within which the light is irradiated from each of the light source chips 111-113 with sufficient brightness is about 60 degrees and where the numerical aperture of the optical path adjustment unit 120 is about 0.5 to about 0.866 will be described. The reason for choosing these values may be because a numerical aperture of less than about 0.5 is more difficult to satisfy the light efficiency requirement of the vehicle lamp 1 of the present disclosure, and a numerical aperture of greater than about 0.866 may increase the overall size, may have little effect on light efficiency due to the use of ineffective brightness, and may be more difficult to satisfy the chromatic aberration requirements.

Here, the light irradiation angle may be about 60 degrees because when a light emitting diode (LED) is used as the light source 110*a*, light of effective brightness is generally generated at a light irradiation angle of within about 60 degrees. However, the present disclosure is not limited thereto, and the light irradiation angle at which light of effective brightness is generated may vary depending on the light emitting characteristics of the light source 110*a*.

The optical path adjustment unit 120 may include a plurality of collimators 121 and 122 arranged in a front-back direction. In the embodiment of the present disclosure, an example where the collimators 121 and 122 include a first collimator 121 disposed in front of the light source unit 110 and a second collimator 122 disposed in front of the first collimator 121 will be described. However, the present disclosure is not limited thereto, and the optical path adjustment unit 120 may include three or more collimators depending on the path along which the light generated from the light source unit 110 is to be guided by the optical path adjustment unit 120.

In the embodiment of the present disclosure, the optical path adjustment unit 120 may include a plurality of collimators 121 and 122 since multiple collimators can adjust the path of light more easily than a single collimator. In addition, the optical path adjustment unit 120 may include a plurality of collimators 121 and 122 to satisfy the light distribution characteristics of a beam pattern to be formed by the vehicle lamp 1 of the present disclosure by adjusting the collimators 121 and 122. This aspect will be described in detail later.

Figure 9:
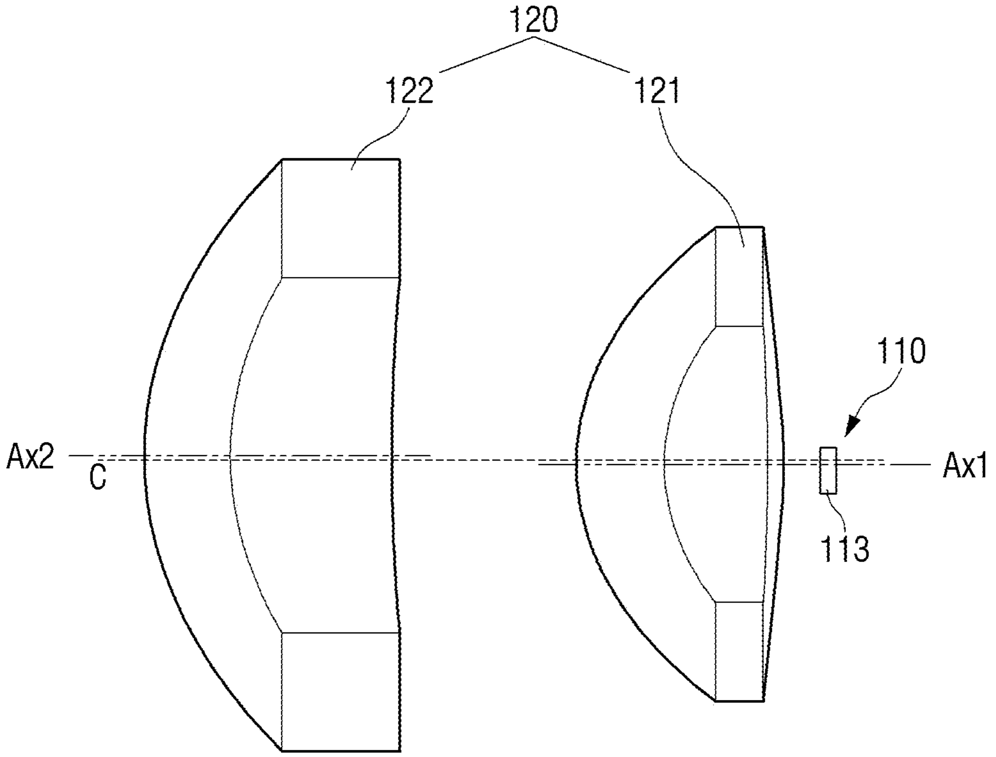
FIG. 9 is a side view of an optical path adjustment unit according to an embodiment of the present disclosure.
Figure 10:
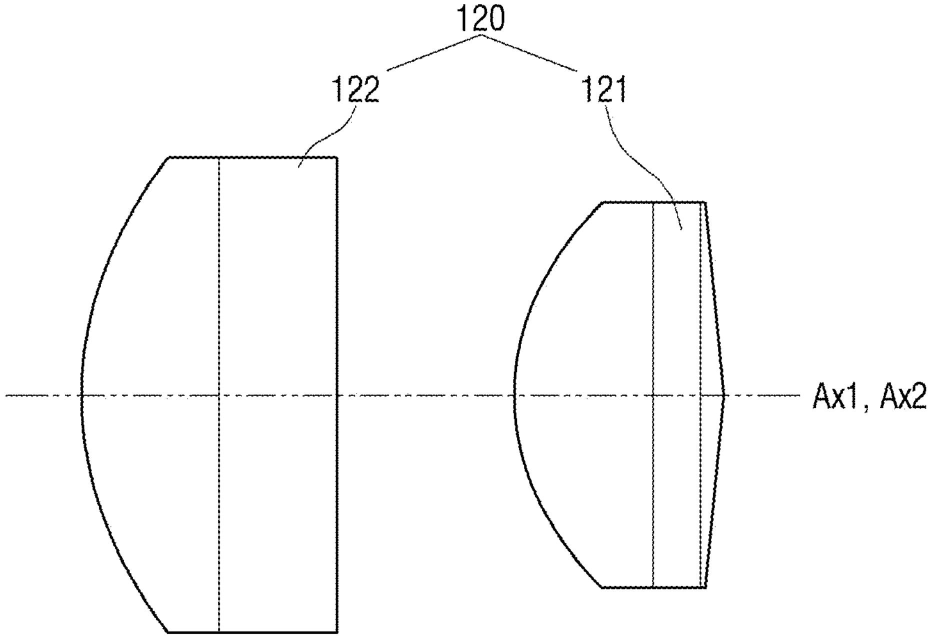
FIG. 10 is a top view of the optical path adjustment unit according to the embodiment of the present disclosure.

FIG. 9 is a side view of an optical path adjustment unit 120 according to an embodiment of the present disclosure. FIG. 10 is a top view of the optical path adjustment unit 120 according to the embodiment of the present disclosure.

Referring to FIGS. 9 and 10, a first central axis Ax1 of the first collimator 121 and a second central axis Ax2 of the second collimator 122 may coincide with each other in the left-right direction (e.g., the lateral direction of the vehicle), but may be spaced apart from each other in an up-down direction (e.g., the vertical direction of the vehicle). In the embodiment of the present disclosure, an example where the second central axis Ax2 is disposed above the first central axis Ax1 will be described. In this case, the first central axis Ax1 may be understood as a line that passes a center of an incident surface and a center of an exit surface of the first collimator 121, and the second central axis Ax2 may be understood as a line that passes a center of an incident surface and a center of an exit surface of the second collimator 122.

The second central axis Ax2 may be disposed above the first central axis Ax1 so that a light irradiation pattern formed by each of the light source chips 111-113 is shifted upward, in other words, so that the vehicle lamp 1 of the present disclosure may form a high beam pattern.

Figure 11:
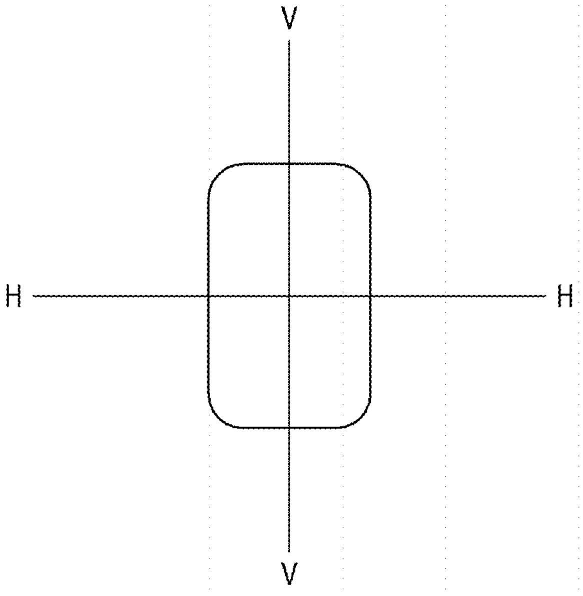
FIG. 11 is a schematic view illustrating light irradiation patterns formed depending on the position of a central axis of each of a first collimator and a second collimator according to an embodiment of the present disclosure.
Figure 11:
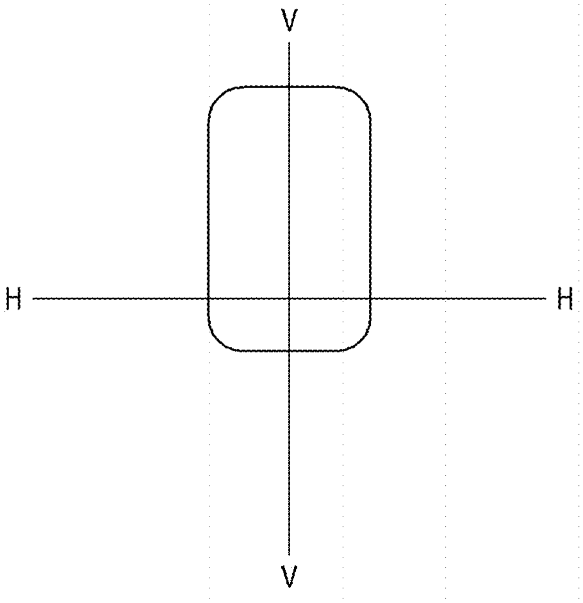

If the first central axis Ax1 and the second central axis Ax2 coincide with each other in the up-down direction, a central portion of a light irradiation pattern formed by each of the light source chips 111-113 may be disposed near a reference line H-H as illustrated in FIG. 11. However, if the second central axis Ax2 is disposed above the first central axis Ax1, the central portion of the light irradiation pattern formed by each of the light source chips 111-113 may be shifted upward with respect to the line H-H. Accordingly, a high beam pattern may be more properly formed by the vehicle lamp 1 of the present disclosure, and the light distribution characteristics for securing a relatively long-distance view ahead of the vehicle may be more easily satisfied.

Although FIG. 11 depicts an example of a light irradiation pattern from one of the light source chips 111-113, the irradiation patterns from other light source chips 111-113 may also exhibit similar light distribution characteristics with only some differences in terms of the position where the light irradiation pattern is formed in the left-right direction.

Figure 12:
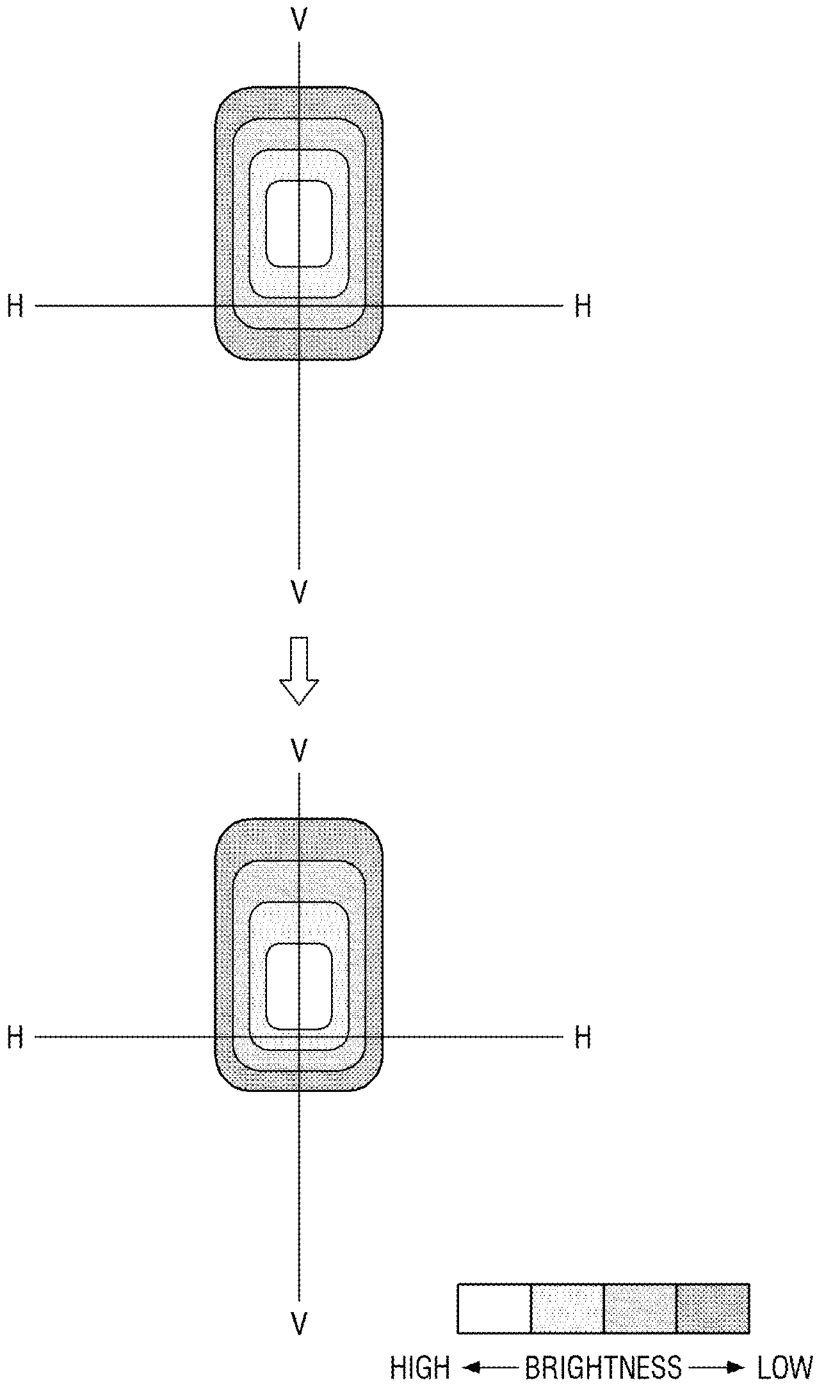
FIG. 12 is a schematic view illustrating light irradiation patterns formed depending on the position of a center line of the light source chip according to the embodiment of the present disclosure.

In each of the light source chips 111-113, in terms of the vertical position, the center line C of the light emitting surface 110*a*' may be disposed between the first central axis Ax1 and the second central axis Ax2. In this case, since the second central axis Ax2 is disposed above the first central axis Ax1 as illustrated in FIGS. 9 and 10 so that a light irradiation pattern is shifted upward as illustrated in FIG. 11, a high-illuminance area (hot spot) of the light irradiation pattern may be relatively shifted toward a lower end of the light irradiation pattern as illustrated in FIG. 12. Accordingly, the high-illuminance area may be disposed near the line H-H, thereby improving the driver's view ahead.

In other words, when the center line C of the light emitting surface 110*a*' of each of the light source chips 111-113 is disposed vertically between the first central axis Ax1 and the second central axis Ax2, the high-illuminance area may be disposed closer to the line H-H than when the center line C of the light emitting surface 110*a*' of each of the light source chips 111-113 disposed at the same vertically position as the first central axis Ax1. Therefore, the obstruction of the driver's view ahead may be more effectively prevented or reduced.

Figure 13:
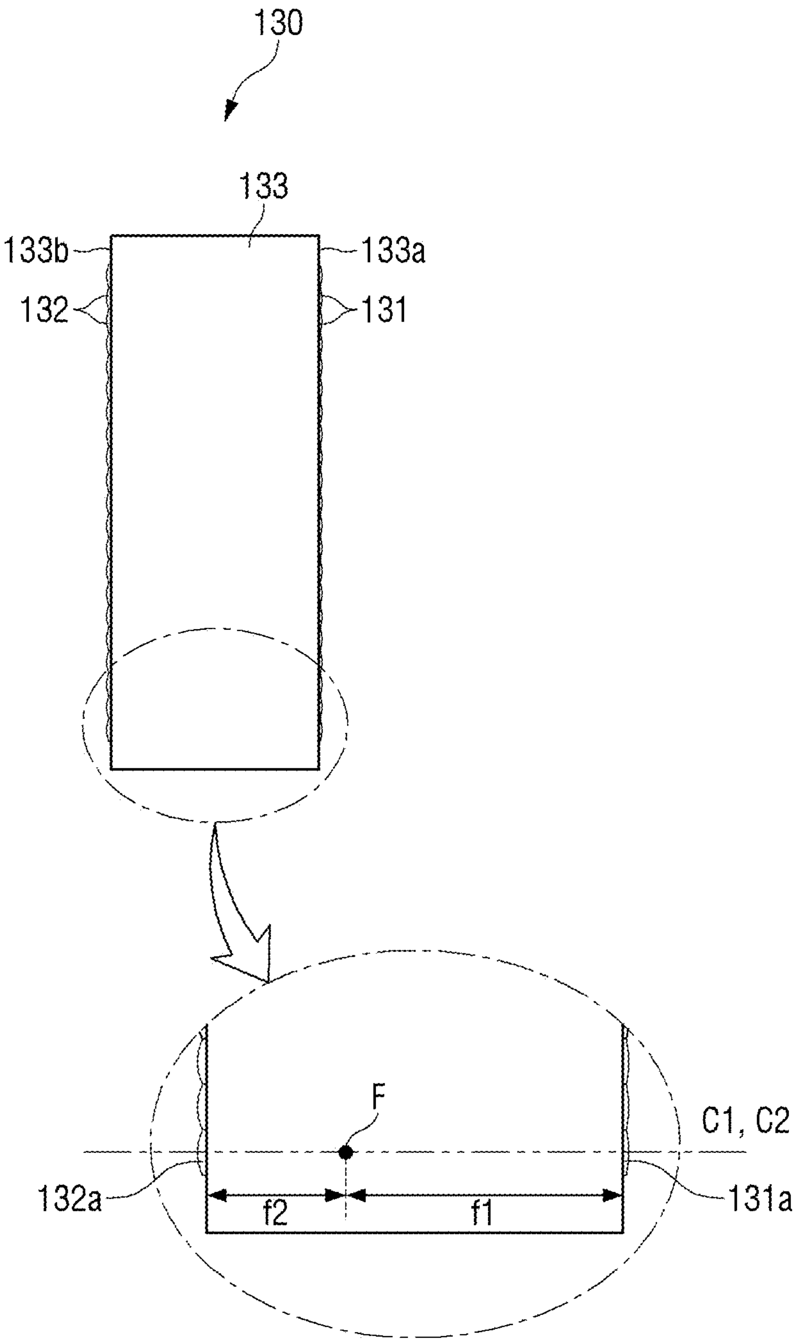
FIG. 13 is a side view of an optical unit according to an embodiment of the present disclosure.
Figure 14:
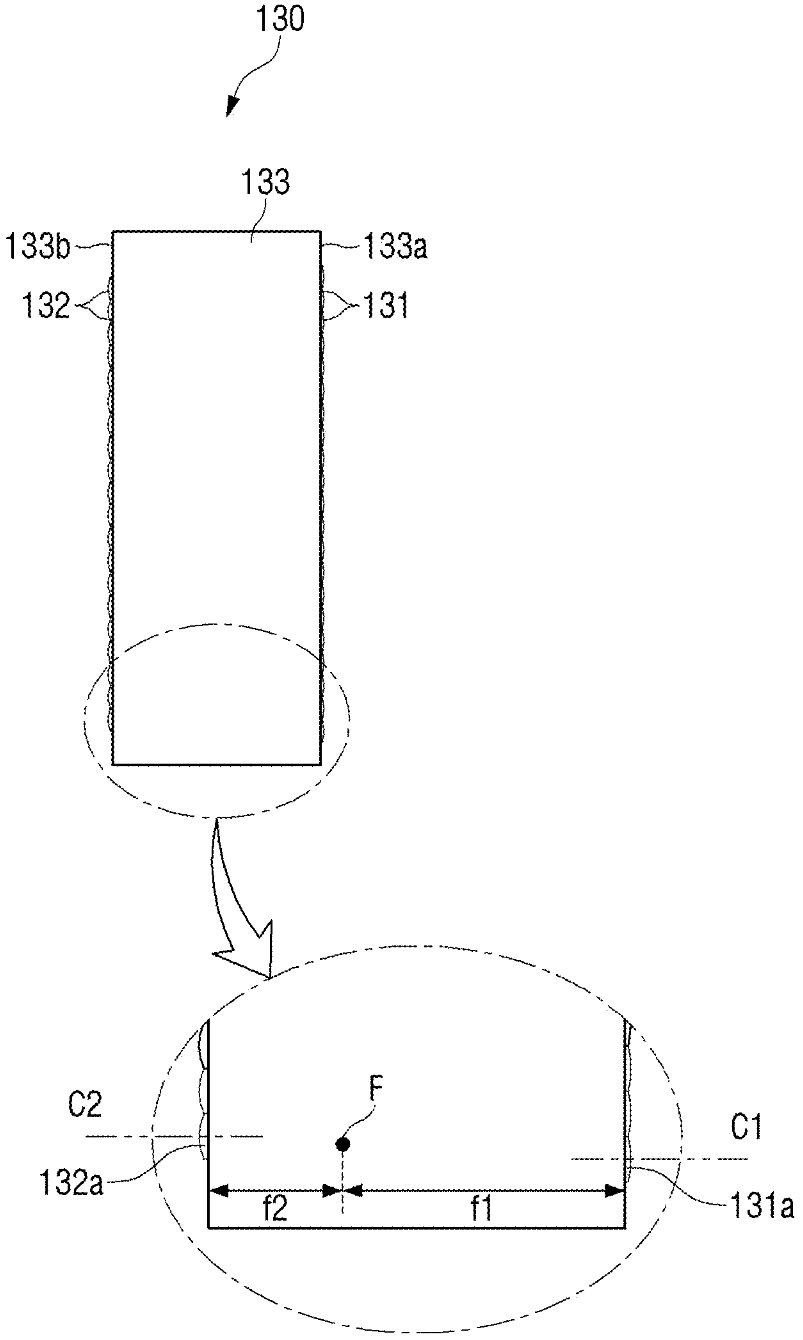
FIG. 14 is a top view of the optical unit according to the embodiment of the present disclosure.

FIG. 13 is a side view of an optical unit 130 according to an embodiment of the present disclosure. FIG. 14 is a top view of the optical unit 130 according to the embodiment of the present disclosure. Referring to FIGS. 13 and 14, the optical unit 130 according to the embodiment of the present disclosure may include a plurality of incident lenses 131 and a plurality of exit lenses 132, each corresponding to each of the plurality of incident lenses 131. The incident lenses 131 and the exit lenses 132 may be respectively disposed on an incident surface 133*a* and an exit surface 133*b* of a light transmission unit 133, which may be made of a light transmitting material such as glass.

In the embodiment of the present disclosure, an example where the incident lenses 131 and the exit lenses 132 are micro lenses will be described since they are advantageous for miniaturization due to their relatively short focal length.

The incident lenses 131 may be arranged such that rows thereof that extend in the left-right direction are arranged in the up-down direction. Similarly, the exit lenses 132 may be arranged such that rows thereof that extend in the left-right direction are arranged in the up-down direction. Overall, the incident lenses 131 and the exit lenses 132 may be arranged in a lattice form.

In the embodiment of the present disclosure, an example where the incident lenses 131 and the exit lenses 132 correspond to each other one-to-one will be described as an example. However, the present disclosure is not limited thereto, and the incident lenses 131 and the exit lenses 132 may correspond to each other in a one-to-one, many-to-one, one-to-many, or many-to-many manner based on the light distribution characteristics of a beam pattern to be formed by the vehicle lamp 1 of the present disclosure.

As shown in FIG. 13, an incident lens 131*a* and an exit lens 132*a* that correspond to each other among the plurality of incident lenses 131 and the plurality of exit lenses 132 may align vertically with each other. In other words, a center line C1 of the incident lens 131*a*, which passes through the center of the incident lens 131*a* and is perpendicular to the incident surface 133*a*, may be disposed at the same vertical position as a center line C2 of the exit lens 132*a*, which passes through the center of the exit lens 132*a* and is perpendicular to the exit surface 133*b*.

On the other hand, as shown in FIG. 14, the incident lens 131*a* and the exit lens 132*a* that correspond to each other among the plurality of incident lenses 131 and the plurality of exit lenses 132 may be laterally spaced apart from each other in the left-right direction. In other words, the center line C1 of the incident lens 131*a* among the incident lenses 131 and the center line C2 of the exit lens 132*a* may have different horizontal distances from, for example, an innermost end of the light transmission unit 133. Accordingly, the plurality of exit lenses 132 may be horizontally offset from the plurality of incident lenses 131 while the exit surface 133*b* and the incident surface 133*a* are still parallel with each other.

Where incident and exit lenses corresponding to each other among the incident lenses 131 and the exit lenses 132 are spaced apart from each other in the left-right direction, light may be required to be incident on each of the incident lenses 131 at an angle with respect to a longitudinal reference line parallel to the front-back direction of the vehicle lamp 1 and/or the vehicle. Therefore, as illustrated in FIG. 15, each center line C of the light emitting surface 110*a*' of each of the light source chips 111-113 may be disposed on either a left side or a right side of the first central axis Ax1 in the left-right direction.

Figure 15:
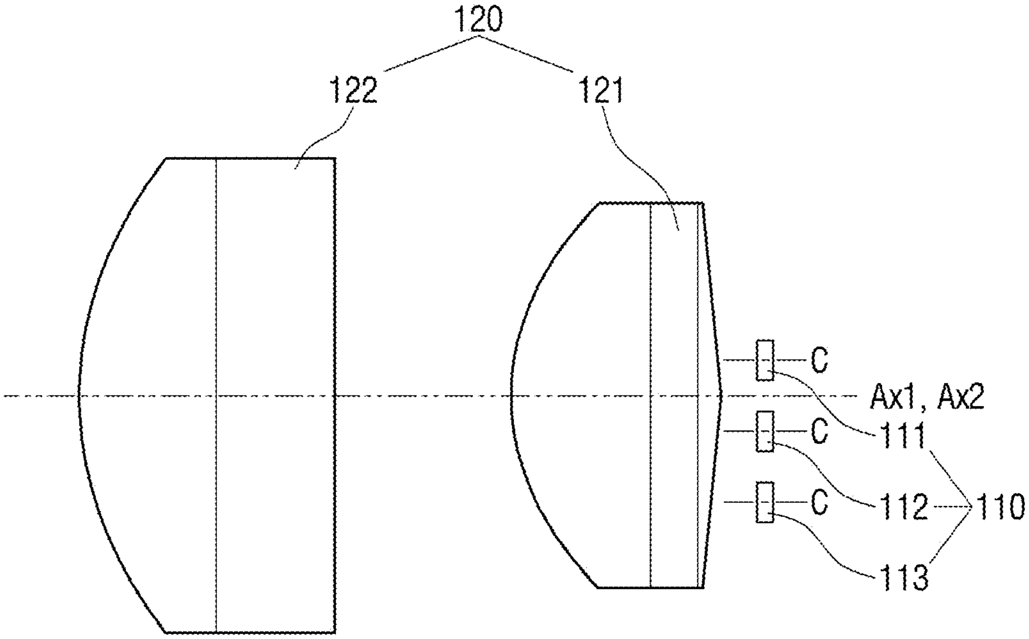
FIG. 15 is a top view illustrating a plurality of light source chips arranged in a left-right direction according to an embodiment of the present disclosure.

In FIG. 15, it is depicted that the entirety of each of the light source chips 111-113 is disposed on one of the left or right side of the first central axis Ax1. However, the present disclosure is not limited thereto, and depending on the size of the packaging 111*b* accommodating the light source 110*a*, a portion of the light emitting surface 110*a*' may also remain on the other side from the one side of the first central axis Ax1 while the center line thereof is disposed on the one side. More particularly, though, in some embodiments, a collective center line of the light source unit 110 may be laterally offset from the first central axis Ax1.

In the embodiment of the present disclosure, the entirety of each of the light source chips 111-113 may be disposed on either the left or right side of the first central axis Ax1 since the first central axis Ax1 and the second central axis Ax2 coincide with each other in the left-right direction (i.e., the first central axis Ax1 and the second central axis Ax2 are disposed at the same lateral distance from, for example, the innermost end of the light transmission unit 133. Accordingly, the entirety of each of the light source chips 111-113 may be disposed on either the left or right side of the second central axis Ax2 as well.

When the respective center line of the light emitting surface 110*a*' of each of the light source chips 111 113 is disposed on either the left or right side of the first central axis Ax1 in the left-right direction, the light source chips 111-113 may be arranged with a relatively greater separation in the left-right direction. Therefore, the light source chips 111-113 can be arranged more easily.

In addition, a focal point F may be disposed between the incident lens 131*a* among the plurality of incident lenses 131 and the exit lens 132*a* corresponding to the incident lens 131*a* among the plurality of exit lenses 132. A focal length f1 between the incident lens 131*a* and the focal point F may be greater than a focal length f2 between the exit lens 132*a* and the focal point F. The focal length f1 of the incident lens 131*a* and the focal length f2 of the exit lens 132*a* may be determined by the curvature of the incident lens 131*a* and the curvature of the exit lens 132*a*, respectively.

In some embodiments, a ratio of the focal length f1 of the incident lens 131*a* to the focal length f2 of the exit lens 132*a* may be set to about 1.5:1 to about 2.0:1.

The focal length f1 of the incident lens 131*a* may be greater than the focal length f2 of the exit lens 132*a* to prevent the light incident on the incident lens 131*a* from being incident on another exit lens adjacent to the exit lens 132*a* and thus being irradiated in an unnecessary direction. When the ratio of the focal length f1 of the incident lens 131*a* to the focal length f2 of the exit lens 132*a* is less than about 1.5:1, the light incident on the incident lens 131*a* may proceed not only to the exit lens 132*a* but also to another exit lens adjacent to the exit lens 132*a*. When the ratio of the focal length f1 of the incident lens 131*a* to the focal length f2 of the exit lens 132*a* is greater than about 2.0:1, the area of the light incident on the exit lens 132*a* may become small, making it difficult to form a light irradiation pattern having desired light distribution characteristics.

A width of the light emitting surface 110*a*' of each of the light source chips 111-113 in the left-right direction may be about 70% or less of a width of corresponding incident and exit lenses among the incident lenses 131 and the exit lenses 132. The light source chips 111-113 may be substantially surface-emitting due to the size of the light emitting surface 110*a*'. Therefore, if the width of the light propagation surface exceeds the width of the incident lenses 131 and the exit lenses 132 in the horizontal direction, the light may enter not only the corresponding incident and exit lenses among the incident lenses 131 and the exit lenses 132, but also another adjacent incident and exit lenses, that is, in an unnecessary direction.

As described above, the vehicle lamp 1 of the present disclosure can satisfy light distribution characteristics of a beam pattern formed by the vehicle lamp 1 of the present disclosure by adjusting the position of the center line C of the light emitting surface 110' of each of the light source chips 111-113 and the position of the central axis Ax1 and/or Ax2 of each of the collimators 121 and 122. Therefore, there is no need to separately manufacture incident and exit lenses and collimators depending on the desired beam pattern. Accordingly, costs can be reduced, thus improving productivity.

In concluding the detailed description, those skilled in the art will appreciate that many variations and modifications can be made to the exemplary embodiments without substantially departing from the principles of the present disclosure. Therefore, the exemplary embodiments of the disclosure are used in a generic and descriptive sense only and not for purposes of limitation.

What is claimed is:

1. A vehicle lamp for forming a predetermined beam pattern using a plurality of lamp modules, wherein each of the lamp modules comprises:

a light source unit that generates light, wherein the light source unit comprises a plurality of light source chips;

an optical path adjustment unit that guides a path of the light irradiated from the light source unit; and an optical unit that transmits the light guided by the optical path adjustment unit to form a beam pattern comprising at least one light irradiation pattern formed by at least one of the plurality of light source chips, wherein the plurality of light source chips are arranged in a left-right direction, wherein the optical path adjustment unit comprises:

a first collimator disposed in front of the plurality of light source chips; and a second collimator disposed in front of the first collimator, and wherein a first central axis of the first collimator and a second central axis of the second collimator are vertically spaced apart from each other in an up-down direction.

2. The vehicle lamp of claim 1, wherein the plurality of lamp modules are arranged in the left-right direction.

3. The vehicle lamp of claim 1, wherein each of the plurality of light source chips comprises:

a light source that has a light emitting surface of a predetermined size; and a packaging that accommodates the light source.

4. The vehicle lamp of claim 1, wherein the second central axis is disposed above the first central axis so that a central portion of a light irradiation pattern formed by each of the plurality of light source chips is shifted upward with respect to a longitudinal reference axis.

5. The vehicle lamp of claim 1, wherein the first central axis and the second central axis are disposed at a same lateral position with respect to a longitudinal reference axis.

6. The vehicle lamp of claim 1, wherein a center line that passes through a center of a light emitting surface of each of the plurality of light source chips is disposed on either a left side or a right side of the first central axis and the second central axis in the left-right direction.

7. The vehicle lamp of claim 1, wherein a center line that passes through a center of a light emitting surface of each of the plurality of light source chips is disposed vertically between the first central axis and the second central axis in the up-down direction so that a high-illuminance area of the light irradiation pattern is shifted toward a lower end of the light irradiation pattern.

8. The vehicle lamp of claim 1, wherein the optical path adjustment unit has a numerical aperture defined by a refractive index of a space through which the light irradiated from the light source unit proceeds and a light irradiation angle of each of the plurality of light source chips, and wherein the numerical aperture of the optical path adjustment unit is set to about 0.5 to about 0.866.

9. The vehicle lamp of claim 1, wherein the optical unit comprises:

a plurality of incident lenses to which light from each of the plurality of light source chips that is guided by the optical path adjustment unit is incident; and a plurality of exit lenses corresponding to the plurality of incident lenses, and wherein centers of an incident lens and an exit lens corresponding to each other among the plurality of incident lenses and the plurality of exit lenses are spaced apart from each other in the left-right direction.

10. The vehicle lamp of claim 9, wherein the incident lens among the plurality of incident lenses has a focal length longer than a focal length of the exit lens corresponding to the incident lens.

11. The vehicle lamp of claim 10, wherein a ratio of the focal length of the incident lens to the focal length of the exit lens is about 1.5:1 to about 2:1.

12. The vehicle lamp of claim 9, wherein a horizontal width of a light emitting surface of each of the plurality of light source chips is about 70% or less of a horizontal width of corresponding incident and exit lenses among the plurality of incident lenses and the plurality of exit lenses.

* * * * *